2,678,563

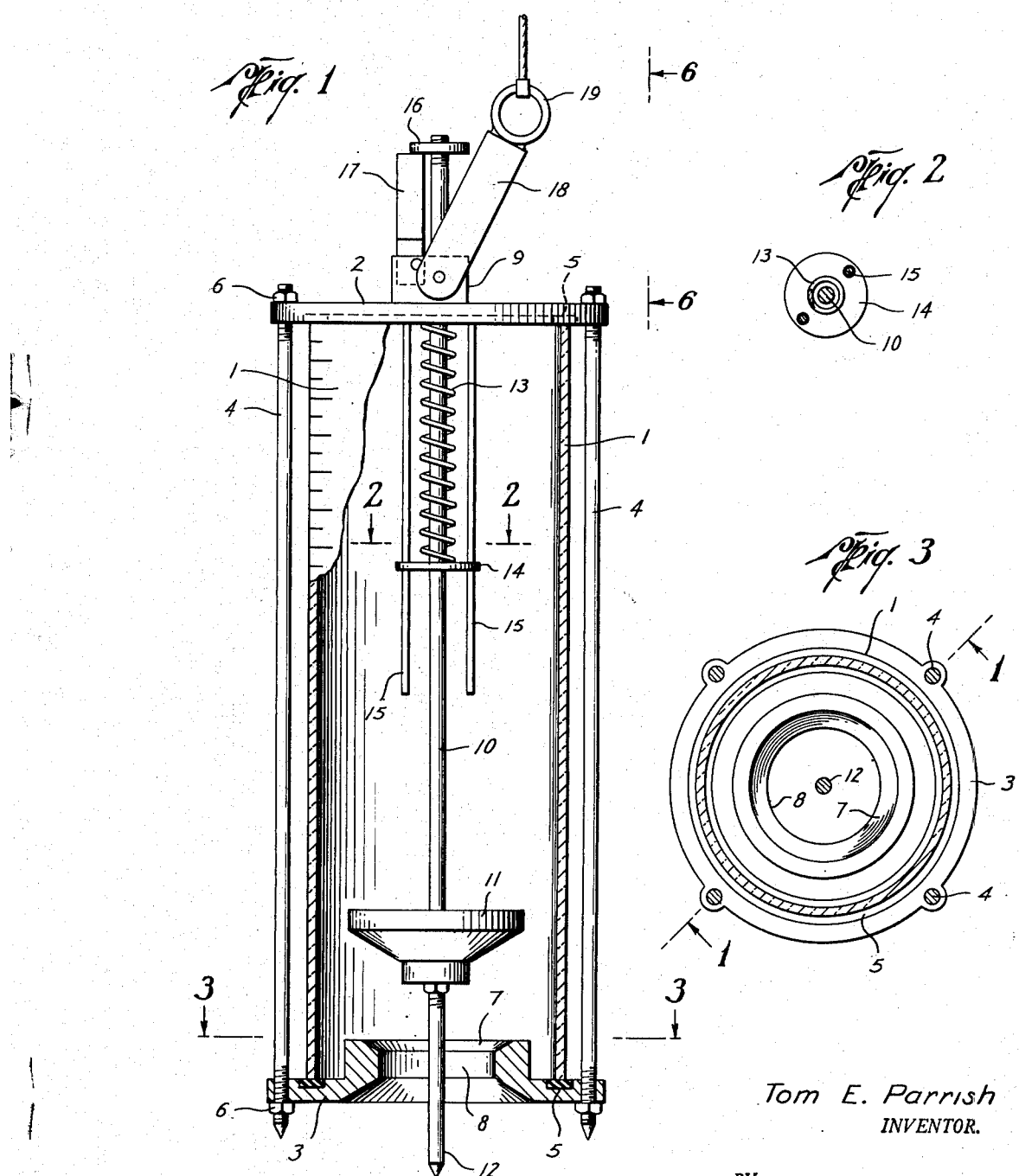
May 18, 1954    T. E. PARRISH    2,678,563
SAMPLING DEVICE
Filed Aug. 28, 1952    2 Sheets-Sheet 1
Tom E. Parrish
INVENTOR.
BY
ATTORNEY May 18, 1954     T. E. PARRISH     2,678,563
SAMPLING DEVICE
Filed Aug. 28, 1952     2 Sheets-Sheet 2
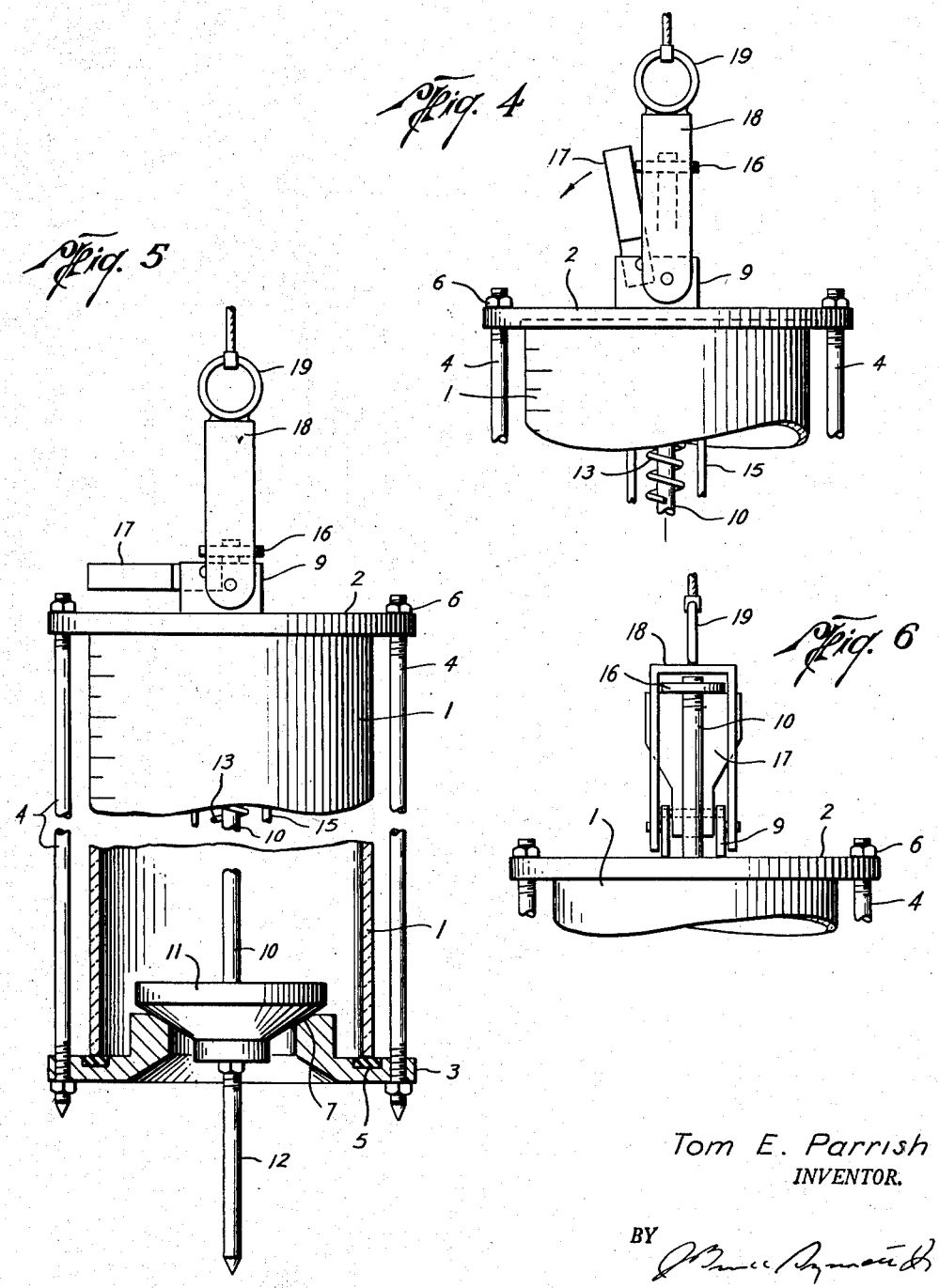
Tom E. Parrish
INVENTOR.
BY
ATTORNEY Patented May 18, 1954

UNITED STATES PATENT OFFICE 2,678,563

SAMPLING DEVICE

Tom E. Parrish, Beaumont, Tex.

Application August 28, 1952, Serial No. 306,886

5 Claims. (Cl. 73—425.4)

The invention concerns a sampling device for use in obtaining representative samples of liquid from various elevations within a tank or the like.

It is an object of the invention to provide a sampling device which may be lowered into a tank until it rests on the bottom, and in which a sample may be obtained at such elevation whereby the position of the interface of two unlike liquids within the tank, with respect to its distance from the bottom of the tank, may be determined by measuring the distance of such interface, as it appears in the sample, from the bottom of the sampling device.

Another object of the invention is to provide a sampling device which may be used to determine the position of the interface of two unlike liquids within the tank, with respect to its distance from the bottom of the tank, when such interface occurs at a considerable distance above the bottom, by lowering the device into the tank a known distance from the top of the tank and obtaining a sample at such elevation, and measuring the distance of the interface, as it appears in the sample, from the top of the tank.

A further object of the invention is to provide a sampling device which may be used to obtain representative samples of liquid from various elevations within the tank, as desired, such elevations being selected according to their distances above or below the interface, or from the bottom of the tank or from the surface of the liquid.

The invention contemplates a sampling device comprising a vertically disposed cylindrical receptacle having a valved lower end, the receptacle being open at the top. With the valve in open position, the device may be lowered into a tank to any desired elevation whereby the liquid contained by the receptacle at any given time is representative of the body of liquid in the area immediately surrounding the receptacle. The device includes means operable from the top of the tank for closing the valve whereby the desired sample may be obtained.

The invention further contemplates a sampling device of the type described in which the receptacle is transparent, and is calibrated, whereby the position of the interface of two unlike liquids within the tank, with respect to its distance from the bottom of the tank, may be determined by observing the position of the interface of such liquids, as it appears in the sample, with respect to the calibrations of the receptacle.

The invention will be readily understood by referring to the following description and the accompanying drawing, in which:

Fig. 1 is a sectional view in elevation, taken on the line 1—1 of Fig. 3, of a sampling device embodying the invention, showing the valve in open position.

Fig. 2 is a sectional plan view taken on the line 2—2 of Fig. 1.

Fig. 3 is a sectional plan view taken on the line 3—3 of Fig. 1.

Fig. 4 is a fragmentary view in elevation showing the supporting bail moved to vertical position whereby it disengages the latch holding the valve in open position.

Fig. 5 is a view in elevation, partly in section, showing the valve in closed position.

Fig. 6 is a fragmentary view in elevation taken on the line 6—6 of Fig. 1.

Referring to the drawing, a vertically disposed cylinder 1, which is open at both ends, is made of transparent material, such as glass or plastic, and is calibrated in inches from top to bottom. A pair of end plates 2 and 3 are provided, one at the top and one at the bottom, which clamp the cylinder 1 between them. The end plates 2 and 3 are generally circular, with central openings therein, and are provided with lateral extensions at four corners for engagement by a plurality of vertically disposed tie rods 4 which fasten the cylinder 1 and the end plates 2 and 3 together. The adjacent sides of the end plates 2 and 3 are grooved to receive gaskets 5 for engagement by the ends of the cylinder 1. The ends of the tie rods 4 are threaded for engagement by nuts 6, and the lower ends of the tie rods 4 preferably are pointed to assist them in penetrating any viscous material which may be present, so that they will rest directly on the bottom of the tank.

A tapered valve seat 7 is formed in the bottom plate 3, the valve seat 7 surrounding the central opening 8. The under side of the bottom plate 3 is tapered upwardly and inwardly adjacent the central opening 8. The top plate 2, which is annular, has a web portion which extends inwardly from one side thereof and terminates in an upstanding center portion 9. A rod 10, which serves as a valve stem, is disposed vertically within an opening formed in the center portion 9 and is slidable with respect thereto. Thus the center portion 9 serves as a guide for the rod 10. A tapered valve 11, the seating surface of which preferably is made of rubber-like material, such as neoprene, is secured to the lower end of the rod 10 and is receivable in the valve seat 7. A pin 12, which may be used to trip the valve mechanism as hereinafter described, is detachably secured to the under side of the valve 11 and extends downwardly thru the central opening 8. The pin 12 is optional, and may be omitted if desired.

The rod 10 is spring biased whereby the valve 11 normally is maintained in closed position. A compression spring 13 surrounds the rod 10, the upper end of the spring 13 bearing against the under side of the top plate 2 and the lower end of the spring 13 engaging a member 14 which is rigidly secured to the rod 10 and extends outwardly therefrom. The member 14 serves as a spring seat as well as a guide for the rod 10. A pair of vertically disposed rods 15, which are rigidly secured at their upper ends to the under side of the top plate 2, are positioned on opposite sides of the rod 10 and slidably engage openings formed in the member 14.

A knob 16, which may be grasped between the fingers, is secured to the upper end of the rod 10 whereby the valve 11 may be lifted manually from the valve seat 7. A latch 17 is pivotally secured to the center portion 9 whereby it may be swung upwardly to engage the knob 16 to retain the valve 11 in open position, as shown in Fig. 1. The position of the pivot is such that the latch 17 drops out of the way, as shown in Figs. 4 and 5, when the knob 16 is disengaged therefrom. A bail 18 is pivotally secured at its ends to the center portion 9. The diameter of the knob 16 is such that it is straddled by the bail 18. A ring 19, for use in attaching a chain or a rope, is secured to the bail 18 intermediate its ends.

As shown in Fig. 4, the bail 18 bears against one side of the latch 17 when the latch 17 is in engagement with the knob 16 and the bail 18 is lifted to vertical position. The arrangement is such that the latch 17 may be disengaged from the knob 16 by a slight jar applied to the bail 28. Alternatively, the latch 17 may be disengaged from the knob 16 by dropping the device to the bottom of the tank, whereby the depending pin 12, upon touching the bottom of the tank, lifts the rod 10.

The invention may be modified in various ways without departing from the spirit and scope thereof.

I claim:

1. A sampling device for use in obtaining representative samples of liquid from various elevations within a tank comprising a vertically disposed cylindrical receptacle which is open at the top and has a valve seat in its lower end, a valve disposed within the receptacle for engagement with the valve seat, a valve stem connected to the valve and extending upwardly therefrom, spring means acting upon the valve stem whereby the valve is normally closed, a latch pivotally secured to the upper end of the receptacle and adapted to be swung upwardly to engage the under side of a knob connected to the upper end of the valve stem whereby the valve may be retained in open position, a bail pivotally secured to the upper end of the receptacle and adapted to bear against the latch, to disengage the latch from the valve stem, upon the application of a slight jar to lift the bail to a vertical position.

2. A sampling device for use in obtaining representative samples of liquid from an elevation adjacent the bottom of a tank comprising a vertically disposed cylindrical receptacle which is open at the top and has a valve seat in its lower end, a valve disposed within the receptacle for engagement with the valve seat, a valve stem connected to the valve and extending upwardly therefrom, spring means acting upon the valve stem whereby the valve is normally closed, a latch pivotally secured to the upper end of the receptacle and adapted to be swung upwardly to engage the under side of a knob connected to the upper end of the valve stem whereby the valve may be retained in open position, a bail pivotally secured to the upper end of the receptacle, and a pin connected to the valve and extending downwardly therefrom, thru the lower end of the receptacle, the arrangement being such that the valve stem is lifted, and the latch is disengaged therefrom, when the pin engages the bottom of the tank.

3. A sampling device for use in obtaining representative samples of liquid from various elevations within a tank comprising a vertically disposed cylinder which is open at both ends, the cylinder being transparent and being calibrated vertically throughout at least a portion of its length, a pair of end plates connected to the ends of the cylinder, each of the end plates having an opening therein and a valve seat being formed in the bottom plate, surrounding the opening therein, a valve disposed within the cylinder for engagement with the valve seat, a valve stem connected to the valve and extending upwardly therefrom, spring means acting upon the valve stem whereby the valve is normally seated, a latch pivotally secured to the top plate whereby it may be swung upwardly to engage the under side of an enlargement formed on the upper end of the valve stem whereby the valve may be retained in open position, the latch being so balanced that it drops out of the way when the weight of the valve stem is lifted therefrom, and a bail pivotally secured to the top plate and straddling the upper end of the valve stem, the arrangement being such that the bail engages the latch, whereby the latch is disengaged from the valve stem, upon moving the bail to vertical position.

4. A sampling device for use in obtaining representative samples of liquid from various elevations within a tank comprising a vertically disposed cylinder which is open at both ends, the cylinder being transparent and being calibrated vertically throughout at least a portion of its length, a pair of end plates connected to the ends of the cylinder, each of the end plates having an opening therein and a valve seat being formed in the bottom plate, surrounding the opening therein, a valve disposed within the cylinder for engagement with the valve seat, a valve stem connected to the valve and extending upwardly therefrom, spring means acting upon the valve stem whereby the valve is normally seated, a latch pivotally secured to the top plate whereby it may be swung upwardly to engage the under side of an enlargement formed on the upper end of the valve stem whereby the valve may be retained in open position, the latch being so balanced that it drops out of the way when the weight of the valve stem is lifted therefrom, and a pin connected to the valve and extending downwardly therefrom, thru the opening in the bottom plate, whereby the pin lifts the valve stem, and the valve stem is disengaged from the latch, upon impact of the pin with the bottom of the tank.

5. A sampling device for use in obtaining representative samples of liquid from various elevations within a tank comprising a vertically disposed cylinder which is open at both ends, the cylinder being transparent and being calibrated vertically throughout at least a portion of its length, a pair of end plates disposed adjacent the ends of the cylinder, a plurality of tie rods connecting the end plates whereby the end plates clamp the cylinder between them, each of the end plates having an opening therein and a tapered valve seat being formed in the bottom plate, surrounding the opening therein, the under side of the bottom plate being tapered adjacent the opening therein, a tapered valve disposed within the cylinder for engagement with the valve seat, a valve stem connected to the valve and extending upwardly therefrom, guide means for the valve stem carried by the top plate, spring means bearing against the top plate and acting upon the valve stem whereby the valve is normally seated, a latch pivotally secured to the top plate whereby it may be swung upwardly to engage the under side of an enlargement formed on the upper end of the valve stem whereby the valve may be retained in open position, the latch being so balanced that it drops out of the way when the weight of the valve stem is lifted therefrom, and a bail pivotally secured to the top plate and straddling the upper end of the valve stem, the arrangement being such that the bail engages the latch, whereby the latch is disengaged from the valve stem, upon moving the bail to vertical position.

References Cited in the file of this patent
UNITED STATES PATENTS

| Number | Name | Date |
|---|---|---|
| 1,210,487 | Kaul | Jan. 2, 1917 |
| 1,744,193 | Adams | Jan. 21, 1930 |
| 2,593,830 | Baker | Apr. 22, 1952 |